(12) United States Patent
Ohrbom et al.

(10) Patent No.: US 7,163,984 B2
(45) Date of Patent: Jan. 16, 2007

(54) WATERBORNE COATING COMPOSITIONS CONTAINING MONOMERIC DIFUNCTIONAL COMPOUNDS

(75) Inventors: Walter H. Ohrbom, Hartland Township, MI (US); Sergio E. Balatan, West Bloomfield, MI (US); David J. Law, Livonia, MI (US); Robert D. Weise, Harper Woods, MI (US)

(73) Assignee: BASF Corporation, Southfield, MI (US)

( * ) Notice: Subject to any disclaimer, the term of this patent is extended or adjusted under 35 U.S.C. 154(b) by 132 days.

(21) Appl. No.: 10/261,428

(22) Filed: Sep. 30, 2002

(65) Prior Publication Data

US 2004/0063850 A1 Apr. 1, 2004
US 2005/0165157 A9 Jul. 28, 2005

Related U.S. Application Data

(63) Continuation-in-part of application No. 09/741,511, filed on Dec. 19, 2000, now Pat. No. 6,541,594.

(51) Int. Cl.
*C08G 18/00* (2006.01)

(52) U.S. Cl. ............ 525/333.7; 525/191; 525/55; 528/45; 528/68; 524/556

(58) Field of Classification Search ............ 524/501, 524/556; 525/406, 154, 157, 163, 131, 333.7, 525/191; 428/423.1; 528/45, 68
See application file for complete search history.

(56) References Cited

U.S. PATENT DOCUMENTS

| | | | |
|---|---|---|---|
| 4,118,427 A | 10/1978 | Rhein et al. | |
| 4,118,437 A | 10/1978 | Parekh | |
| 4,246,376 A | 1/1981 | Didomenico, Jr. | 525/398 |
| 4,546,120 A | 10/1985 | Perrman et al. | 521/159 |
| 5,236,987 A | 8/1993 | Arendt | |
| 5,334,650 A | 8/1994 | Serdiuk et al. | 524/591 |
| 5,587,428 A | 12/1996 | Jones et al. | 525/165 |
| 5,665,433 A | 9/1997 | Moussa et al. | |
| 5,688,867 A | 11/1997 | Scheibelhoffer et al. | 525/168 |
| 5,783,272 A | 7/1998 | Wong | |
| 5,814,410 A | 9/1998 | Singer et al. | |
| 5,976,615 A | 11/1999 | Menovcik et al. | |
| 5,976,701 A * | 11/1999 | Barancyk et al. | 428/423.1 |
| 6,391,973 B1 * | 5/2002 | Law et al. | 525/191 |
| 6,541,594 B1 * | 4/2003 | Ohrbom et al. | 528/48 |
| 2002/0086966 A1 | 7/2002 | Weise et al. | 526/312 |
| 2002/0107325 A1 | 8/2002 | Gilbert et al. | 525/125 |
| 2003/0216516 A1* | 11/2003 | Swarup et al. | 525/123 |

FOREIGN PATENT DOCUMENTS

| | | |
|---|---|---|
| EP | 0 026 984 | 9/1980 |
| WO | WO 95/19997 | 7/1995 |
| WO | WO 96/23034 | 1/1996 |
| WO | WO 96/23035 | 1/1996 |
| WO | WO 99/35189 | 7/1999 |
| WO | WO 02/50203 | 6/2002 |

OTHER PUBLICATIONS

Frank N. Jones, "End-Grafting of Oligoesters Based on Terephthalic Acid and Linear Diols for High Solids Cotaing", Apr. 21, 1995, pp. 1609-1618.
Robson F. Storey et al., "Proceedings of the twenty-fourth international waterborne, high-solids, and powder coatings symposium", Feb. 5-7, 1997, pp. title, & 1-21.
Frank N. Jones et al. "Recent studies of self-condensation and co-condensation of melamine-formaldehyde resins; cure at low temperatures", (1994), pp. 189-208.
Robson F. Storey et al., "Proceedings of the twenty-fourth international waterborne, high-solids, and powder coatings symposium", Feb. 21-23, 1990, pp. title, & 447-470.
Shubang Gan et al, "Recent studies of the curing of polyerester-melamine enamels, possible causes of overbake softening", Feb. 1-3, 1989, pp. 87-109.
Walter H. Ohrbom et al., U.S. Appl. No. 10/261,427, filed Sep. 30, 2002, pp. 1-23, and abstract.
Walter H. Ohrbom et al., U.S. Appl. No. 10/261,888, filed Sep. 30, 2002, pp. 1-42, and abstract.
International Search Report for BASF Corporation, et al. PCT/US 03/20855 filed Jan. 7, 2003.

* cited by examiner

*Primary Examiner*—Satya B Sastri

(57) ABSTRACT

The invention provides curable waterborne coating compositions comprising an aqueous dispersion (A) comprising an organic binder component (A1) comprising at least 5% by weight of a reactive component (a), based on the total weight of organic binder component (A1), and at least one crosslinking component (B). The reactive component (a) is substantially free of any heteroatoms and is a not a crystalline solid at room temperature and comprises from (i) 12 to 72 carbon atoms, and (ii) at least two functional groups.

The curable waterborne coating compositions of the invention show significantly improved pop resistance while also providing improved chip resistance, weathering resistance, flexibility, and/or scratch & mar resistance.

15 Claims, No Drawings

WATERBORNE COATING COMPOSITIONS CONTAINING MONOMERIC DIFUNCTIONAL COMPOUNDS

CROSS REFERENCE TO RELATED APPLICATION

The present application is a continuation-in-part of application Ser. No. 09/741,511, filed Dec. 19, 2000 now U.S. Pat. No. 6,541,594 B2, issued on Apr. 1, 2003.

BACKGROUND OF THE INVENTION

This invention relates to waterborne coating compositions, especially thermoset waterborne coating compositions intended for use in the automotive and/or transportation industries.

Curable coating compositions such as thermoset coatings are widely used in the coatings art. They are often used as topcoats in the automotive and industrial coatings industry. Color-plus-clear composite coatings are particularly useful as topcoats where exceptional gloss, depth of color, distinctness of image, or special metallic effects are desired. The automotive industry has made extensive use of these coatings for automotive body panels.

The effect of the coating process on the environment and the effect of the environment on coatings have increasingly shaped the coatings art in the last few decades. The industry has put considerable effort into developing coatings with materials that will be less harmful toward the environment. One area of interest relates to waterborne coatings. Such coatings generally contain lower levels of volatile organic compounds.

However, it has been difficult to devise coatings, especially waterborne coatings, which will also have the desired resistance to environmental degradation in conjunction with other acceptable film performance properties.

For example, color-plus-clear composite coatings require an extremely high degree of clarity in the clearcoat to achieve the desired visual effect. High-gloss coatings also require a low degree of visual aberrations at the surface of the coating in order to achieve a high distinctness of image (DOI). As such, these coatings, whether solvent borne or waterborne, are especially susceptible to a phenomenon known as environmental etch. Environmental etch manifests itself as spots or marks on or in the finish of the coating that often cannot be rubbed out.

It is often difficult to predict the degree of resistance to environmental etch that a high gloss or color-plus-clear composite coating will exhibit. Many coating compositions known for their durability and/or weatherability when used in exterior paints do not provide the desired level of resistance to environmental etch when used in high gloss coatings such as the clearcoat of a color-plus-clear composite coating. Many compositions have been proposed for use as the film-forming component of the clearcoat of a color-plus-clear composite coating. Examples include carbamate-aminoplast systems, polyurethanes, acid-epoxy systems and the like. However, many prior art systems suffer from application problems, compatibility problems with the pigmented basecoat, solubility problems and the like.

As a result, it would be advantageous to provide waterborne coating compositions having improved solids or % nonvolatile, popping resistance, flexibility, scratch & mar resistance, cold crack resistance, chip resistance and/or the like. At the same time, such improvements must be achieved without any decrease in environmental etch resistance or other commercially required performance property. It would be particularly advantageous to provide improved etch resistant waterborne coating compositions which have an increased % NV (nonvolatile) or decreased VOC (volatile organic content) at a sprayable viscosity.

It would be particularly desirable to provide aqueous coating compositions that are suitable for use as the clearcoat layer in color-plus-clear composite coatings and possess improved pop or popping resistance. "Pop resistance" or "popping resistance" as used herein refers to the resistance of an applied coating to form bubbles or pops at the surface of the film before or during the curing of the applied film. Such pop resistance is particularly important in clearcoats due to their higher film build requirements. Popping defects generally increase with increasing film build.

Accordingly, it is an object of the instant invention to provide curable waterborne coating compositions which provide all of the advantages of prior art coating compositions, especially good environmental etch resistance, but further exhibit improvement in one or more of the following performance parameters, i.e., popping resistance, flexibility, scratch and mar resistance, weathering resistance, UV durability, and/or chip resistance.

It is another object of the invention to provide a technology for improving one or more of the following performance parameters, i.e., % nonvolatile solids, popping resistance, flexibility, scratch and mar resistance, and/or chip resistance, in a wide variety of curable waterborne coating compositions and applications, such as primers, basecoats, clearcoats, two-component systems, anti-chip coating compositions, coatings for flexible substrates, and the like.

Most particularly, it is an object of the invention to provide a curable waterborne coating composition that is suitable for use as an automotive clearcoat and possesses improved pop resistance.

SUMMARY OF THE INVENTION

It has unexpectedly been found that these and other objects of the invention can be achieved with curable waterborne coating compositions comprising an aqueous dispersion (A) comprising a particular reactive component (a).

The invention provides curable waterborne coating compositions comprising an aqueous dispersion (A) comprising an organic binder component (A1) comprising at least 5% by weight of a reactive component (a) and at least one crosslinking component (B). Reactive component (a) is substantially free of any heteroatoms, is not a crystalline solid at room temperature, has from 12 to 72 carbon atoms and at least two functional groups.

DETAILED DESCRIPTION OF THE PREFERRED EMBODIMENTS

The waterborne coating compositions of the invention require the use of an aqueous dispersion (A) of an organic binder component (A1).

Aqueous dispersion (A) refers to a colloidal dispersion of organic binder component (A1) in water. Organic binder component (A1) may be a solid, liquid or mixture thereof, and will be comprised of organic based polymers, oligomers, materials, monomers, or mixtures thereof. The organic based polymers, oligomers, materials and/or monomers may or may not contain one or more organic solvents. If the organic binder component (A1) is in liquid form, the aqueous dispersion (A) may be referred to as emulsion (A). If organic binder component (A1) is in solid or waxy form, the aqueous dispersion (A) will be a dispersion.

It will be appreciated that the stability of aqueous dispersions (A) will be a function of time, temperature, mechanical energy, and other factors appreciated by those of skill in the art. Preferred aqueous dispersions (A) will generally be characterized by a lack of phase separation or settling for at least twenty-four hours when stored in a sealed container and left undisturbed at room temperature. More preferred aqueous dispersions (A) will be free of phase separation or settling for at least two weeks. The most preferred aqueous dispersions (A) will be characterized as being free of phase separation or settling for at least six months when stored in a sealed container and left undisturbed at room temperature. Aqueous dispersions suitable in the invention may generally have average particle sizes of between 10 and 1000 microns.

It is an aspect of the invention that organic binder component (A1) comprise at least 5% by weight of a reactive component (a), based on the total weight of organic binder component (A1).

Reactive component (a) should have from 12 to 72 carbons, have at least two functional groups (ii), be substantially free of heteroatoms, and not be a crystalline solid at room temperature.

The reactive component (a) of the invention will generally have from 12 to 72 carbons, more preferably from 18 to 54 carbons, and most preferably from 36 to 54 carbons. In a particularly preferred embodiment of the invention, the reactive component (a) will have 36 carbons.

"Heteroatoms" as used herein refers to atoms other than carbon or hydrogen. The phrase "substantially without" heteroatoms as used herein means that the portion of reactive component (a) which does not include functional groups (ii) will generally have no more than two atoms which are other than carbon or hydrogen, i.e., atoms such as N, O, Si, mixtures thereof, and the like. More preferably, that portion of reactive component (a) that does not include functional groups (ii) will have no more than one atom that is other than carbon or hydrogen. In a most preferred embodiment, that portion of reactive component (a) that does not include functional groups (ii) will have no heteroatoms, i.e., will consist solely of carbon and hydrogen atoms. Thus, in a most preferred aspect of the invention, the only heteroatoms in reactive component (a) will be present in functional groups (ii).

It is another aspect of the invention that reactive component (a) will not be a crystalline solid at room temperature, i.e., at temperatures of from 65 to 75° F. "Crystalline" refers to a solid characterized by a regular, ordered arrangement of particles. Rather, reactive component (a) will be an amorphous solid, a wax or a liquid at room temperature. "Amorphous" refers to a noncrystalline solid with no well-defined ordered structure.

In a more preferred embodiment of the invention, reactive component (a) will comprise a mixture of two or more saturated or unsaturated structures selected from the group consisting of noncyclic structures for reactive component (a), aromatic-containing structures for reactive component (a), cyclic-containing structures for reactive component (a), and mixtures thereof. Saturated structures and aromatic structures that are free of non-aromatic unsaturated sites are preferred, especially where durability issues are of concern. For example, a most preferred reactive component (a) will comprise a mixture of two or more structures selected from the group consisting of aliphatic structures for reactive component (a), aromatic-containing structures for reactive component (a), cycloaliphatic-containing structures for reactive component (a), and mixtures thereof.

It is particularly preferred that reactive component (a) comprise at least two, more preferably three, of the three cited structures. If reactive component (a) comprises only two of the three cited structures for reactive component (a), then at least one of the two structures must be present as a mixture of two or more isomers thereof.

For example, the mixture of reactive components (a) may comprise at least one aliphatic structure for reactive component (a) and at least one other structure for reactive component (a) selected from the group consisting of aromatic-containing structures for reactive component (a), cycloaliphatic-containing structures for reactive component (a), and mixtures thereof. If the 'at least one other structure for reactive component (a)' is not a mixture of aromatic-containing structures for reactive component (a) and cycloaliphatic-containing structures for reactive component (a), either the aromatic-containing structures or the cycloaliphatic containing structures must be present as a mixture of two or more isomers.

Alternatively, the mixture of reactive components (a) may comprise at least one aromatic-containing structure for reactive component (a) and at least one other structure for reactive component (a) selected from the group consisting of aliphatic structures for reactive component (a), cycloaliphatic-containing structures for reactive component (a), and mixtures thereof. If the 'at least one other structure for reactive component (a)' is not a mixture of aliphatic structures for reactive component (a) and cycloaliphatic-containing structures for reactive component (a), either the aliphatic structures or the cycloaliphatic containing structures must be present as a mixture of two or more isomers.

In one preferred embodiment, reactive component (a) will comprise a mixture of two or more structures selected from the group consisting of aliphatic structures for reactive component (a), aromatic-containing structures for reactive component (a), cycloaliphatic-containing structures for reactive component (a), and mixtures thereof, wherein at least one of the two or more structures is either a cycloaliphatic-containing structure or an aromatic-containing structure In a most preferred embodiment, reactive component (a) will comprise one or more aliphatic structures for reactive component (a), one or more aromatic-containing structures for reactive component (a), and one or more cycloaliphatic-containing structures for reactive component (a).

Particularly advantageous mixtures of reactive component (a) will comprise from 3 to 25% by weight of reactive component (a) having an aliphatic structure, from 3 to 25% by weight of reactive component (a) having an aromatic-containing structure, and 50 to 94% by weight of reactive component (a) having a cycloaliphatic-containing structure. More preferred mixtures of reactive component (a) will comprise from 3 to 18% by weight of reactive component (a) having an aliphatic structure, from 5 to 23% by weight of reactive component (a) having an aromatic-containing structure, and 55 to 85% by weight of reactive component (a) having a cycloaliphatic-containing structure. Most preferred mixtures of reactive component (a) will comprise from 5 to 10% by weight of reactive component (a) having an aliphatic structure, from 10 to 20% by weight of reactive component (a) having an aromatic-containing structure, and 60 to 70% by weight of reactive component (a) having a cycloaliphatic-containing structure.

Finally, reactive component (a) must comprise at least two functional groups (ii). Preferred reactive components (a)

may have from two to six functional groups (ii) while most preferably reactive component (a) will have two to three functional groups (ii).

Functional groups (ii) may be selected from a variety of active hydrogen containing groups and groups reactive with such active hydrogen containing groups. While it is most preferred that reactive component (a) enter into and be a part of the film-forming reaction, it is not a requirement of the invention that reactive component (a) be crosslinkable with either crosslinking component (B) or other film-forming components (b) of organic binder component (A1).

Thus, in one alternative embodiment of the invention, reactive component (a) will not be a part of the film-forming reaction. In this embodiment of the invention, the functional groups (ii) of reactive component (a) will be chosen so as not to be reactable with either the functional groups (iii) of crossing component (B) or any functional groups of any film-forming components (b) present in the coating compositions of the invention. In this embodiment, film-forming reactions will most preferably occur between one or more film-forming components (b) and one or more crosslinking components (B).

In another embodiment of the invention, the functional groups (ii) of reactive component (a) will be reactable with the functional groups of one or more film-forming components (b) present in the coating composition of the invention, most preferably as part of organic binder component (A1). In a more preferred version of this embodiment, at least one of film-forming components (b) or reactive component (a) will also be reactable with crosslinking component (B).

In an alternative embodiment, the functional groups (ii) of reactive component (a) will be reactable with one or more functional groups (iii) of one or more crosslinking components (B).

In another embodiment, functional groups (ii) of reactive component (a) will be reactable with both of the functional groups of film-forming component (b) and crosslinking component (B). It will be appreciated that in this instance, there may be more than one type of functional group (ii) on reactive component (a). That is, reactive component (a) may comprise two or more different functional groups (ii).

It is most preferred that functional group (ii) be reactable with at least one functional group (iii) of crosslinking component (B) and not with any film-forming components (b) of organic binder component (A1).

The above noted film-forming reactions may produce chemical linkages that may or may not be thermally reversible. However, in a most preferred embodiment of the invention, the functional groups (ii) of reactive component (a) and the functional groups (iii) of crosslinking component (B) will be selected so that reaction there between results in a thermally irreversible chemical linkage. The term "thermally irreversible linkage" as used herein refers to a linkage the reversal of which is not thermally favored under the traditional cure schedules used for automotive coating compositions. Illustrative examples of suitable thermally irreversible chemical linkages are urethanes, ureas, esters and non-aminoplast ethers. Preferred thermally irreversible chemical linkages are urethanes, ureas and esters, with urethane linkages being most preferred. Such chemical linkages will not break and reform during the crosslinking process as is the case with the linkages formed via reaction between hydroxyl groups and aminoplast resins.

As discussed below, it is known that certain "pairs" of functional groups will produce such thermally irreversible chemical linkages. If one member of a "pair" is selected for use as functional group (ii), the other member of the "pair" will most preferably be selected as functional group (iii) of crosslinking agent (B). Examples of illustrative reactant or functional group "pairs" producing thermally irreversible linkages are hydroxy/isocyanate (blocked or unblocked), hydroxy/epoxy, carbamate/aminoplast, carbamate/aldehyde, acid/epoxy, amine/cyclic carbonate, amine/isocyanate (blocked or unblocked), urea/aminoplast, and the like.

Illustrative functional groups (ii) will preferably be selected from the group consisting of carboxyl, hydroxyl, aminoplast functional groups, urea, carbamate, isocyanate, (blocked or unblocked), epoxy, cyclic carbonate, amine, aldehyde and mixtures thereof. Preferred functional groups (ii) are hydroxyl, primary carbamate, isocyanate, aminoplast functional groups, epoxy, carboxyl and mixtures thereof. Most preferred functional groups (ii) are hydroxyl, primary carbamate, and mixtures thereof. These preferences pertain regardless of whether a thermally reversible or irreversible linkage is desired. It will be appreciated by those of skill in the art that it is the selection of a corresponding reactable functional groups in either film-forming components (b) or crosslinking components (B) that determine whether resulting linkages will be thermally reversible or irreversible.

Aminoplast functional groups may be defined as those functional groups resulting from the reaction of an activated amine group and an aldehyde or formaldehyde. Illustrative activated amine groups are melamine, benzoguanamine, glycoluril, amides, carbamates, and the like. The resulting reaction product may be used directly as functional group (ii) or may be etherified with an alcohol prior to use as functional group (ii).

Amine groups suitable for use as functional group (ii) may be primary or secondary, but primary amines are most preferred.

Illustrative examples of suitable reactive components (a) having functional groups (ii) which are carboxyl are fatty acids and addition reaction products thereof, such as dimerized, trimerized and tetramerized fatty acid reaction products and higher oligomers thereof. Suitable acid functional dimers and higher oligomers may be obtained by the addition reaction of C12–18 monofunctional fatty acids. Suitable monofunctional fatty acids may be obtained from Cognis Corporation of Ambler, Pa. Such materials will be acid functional and will contain some unsaturation. In addition, saturated and unsaturated dimerized fatty acids are commercially available from Uniqema of Wilmington, Del.

Hydroxyl functional reactive components (a) are commercially available as the Pripol™ saturated fatty acid dimer (Pripol™ 2033) supplied by Uniqema of Wilmington, Del. Hydroxyl functional reactive components (a) may also be obtained by reduction of the acid group of the above-discussed fatty acids.

Reactive components (a) having two or more carbamate functional groups may be obtained via the reaction of the hydroxyl functional reactive components (a) with a low molecular weight carbamate functional monomer such as methyl carbamate under appropriate reaction conditions. Alternatively, carbamate functional reactive components (a) may be made via decomposition of urea in the presence of hydroxyl functional reactive component (a) as described above. Finally, carbamate functional reactive components (a) can be obtained via the reaction of phosgene with the hydroxyl functional reactive component (a) followed by reaction with ammonia.

Reactive components (a) having amine functional groups (ii) may be obtained via reaction of the acid functional component (a) to form an amide, followed by conversion to a nitrile and subsequent reduction to an amine.

Reactive components (a) having isocyanate functional groups (ii) made be obtained via reaction of the amine functional component (a) described above with carbon dioxide.

Reactive components (a) having aminoplast functional groups (ii) may be made via reaction of carbamate or amide functional reactive component (a) as described above with formaldehyde or aldehyde. The resulting reaction product may optionally be etherified with low boiling point alcohols.

Reactive components (a) having aldehyde functional groups (ii) may be made via reduction of the acid functional reactive components (a) described above.

Reactive components (a) having urea functional groups (ii) may be made via reaction of an amine functional component (a) with urea. Alternatively, amine functional component (a) can be reacted with phosgene followed by reaction with ammonia to produce the desired urea functional groups (ii).

Reactive components (a) having epoxy functional groups (ii) may be made using either saturated or unsaturated fatty acids described above. If an unsaturated fatty acid is used, reaction with peroxide will form internal epoxy groups. More preferably, an acid or hydroxyl functional reactive component (a) will be reacted with epichlorohydrin. Preferred epoxy functional reactive components (a) will be obtained using saturated starting materials.

Reactive components (a) having cyclic carbonate functional groups (ii) may be made via carbon dioxide insertion into an epoxy functional reactive component (a) as described above.

A most preferred example for reactive component (a) will be a mixture of the following structures:

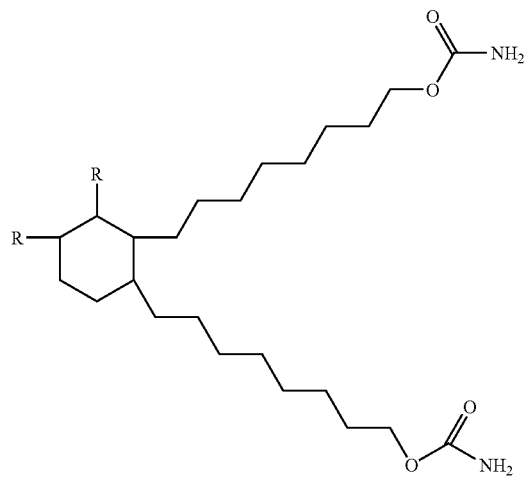

-continued

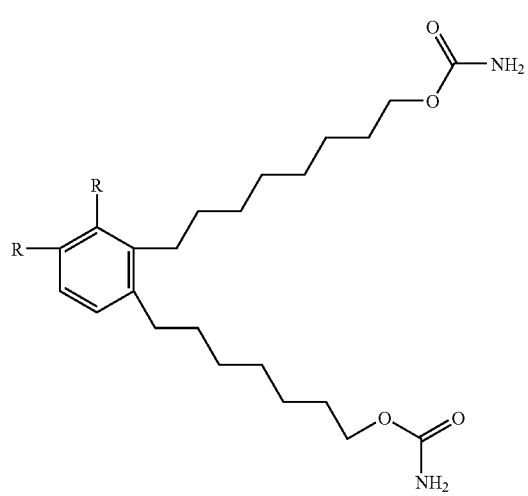

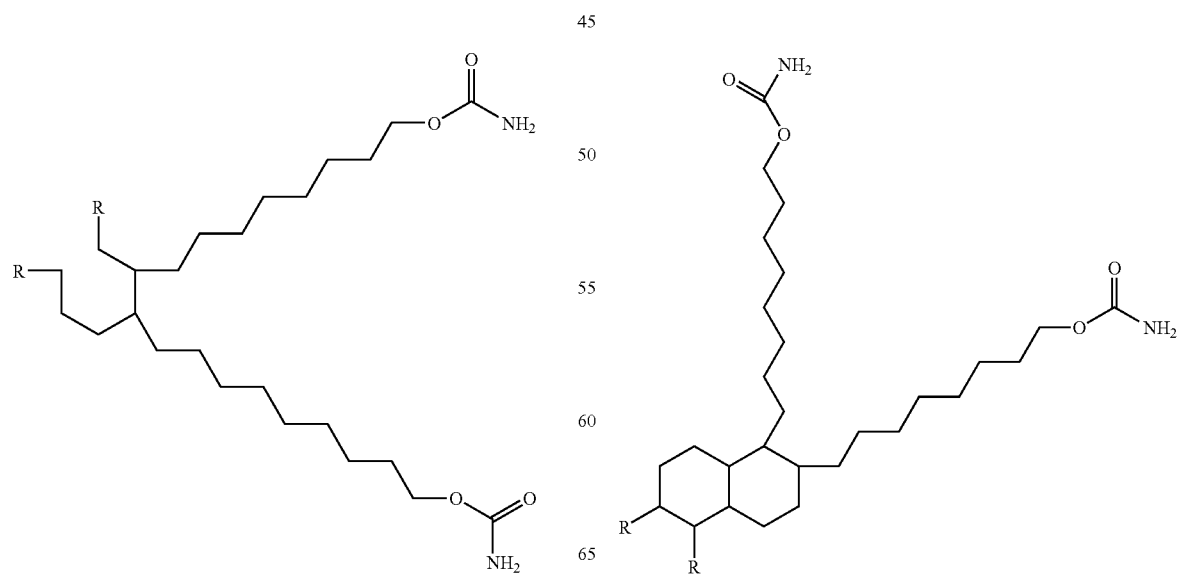

-continued

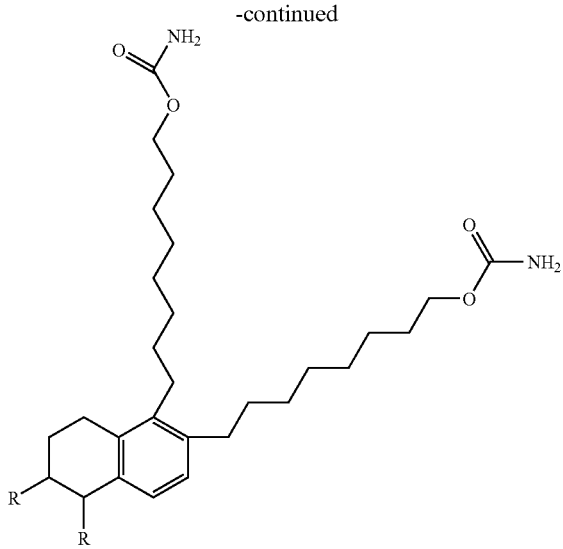

Organic binder component (A1) will generally comprise from at least 5% by weight of reactive component (a), based on the total weight of organic binder component (A1), preferably from 5 to 100%, more preferably from 5 to 80 and most preferably from 5 to 75%, based on the total weight of organic binder component (A1).

In addition to reactive component (a), organic binder component (A1) will further comprise from 0 to 95% by weight of one or more film-forming components (b), based on the total weight of organic binder component (A1). In a preferred embodiment, organic binder component (A1) will comprise from 0 to 95% by weight of one or more film-forming components (b), more preferably from 20 to 95% by weight, and most preferably from 75 to 95% by weight, all based on the total weight of organic binder component (A1).

In addition to the film-forming components (b) present in organic binder component (A1), the coating compositions of the invention may comprise other aqueous dispersions (A') containing other film-forming components (b) or water dispersible film-forming components (b). In this case, film-forming components (b) not present in organic binder component (A1) may be present in the coating compositions of the invention in an amount of from 0 to 95, based on the total weight of organic binder component (A1) and (A').

As discussed above, the one or more film-forming components (b) present in organic binder component (A1) will have a plurality of functional groups that may be reactive with one or more of other film-forming components (b), the functional groups (ii) of reactive component (a), the functional groups (iii) of crosslinking component (B) and mixtures thereof. However, most preferably, the one or more film-forming components (b) will be reactable only with the one or more functional groups (iii) of crosslinking component (B).

Thus, in a particularly preferred embodiment of the invention, reactive component (a) and one or more film-forming components (b) will not react with each other. Rather, in this most preferred embodiment, both reactive component (a) and one or more film-forming components (b) will react solely with the one or more functional groups (iii) of crosslinking component (B).

The reactions between the film-forming components (b) and either one or both of reactive component (a) and crosslinking component (B) may produce either reversible or irreversible chemical linkages as discussed above. In a most preferred embodiment, the functional groups (ii) of reactive component (a) and the functional groups (iii) of crosslinking component (B) will be selected so that the reaction product thereof is a thermally irreversible chemical linkage such as is described above. The linkages produced by the reaction between the one or more film-forming components (b) and reactive component (a) may or may not be irreversible but will most preferably be irreversible.

The one or more film-forming components (b) suitable for use in the invention may generally be any organic based polymer, oligomer, material, monomer and/or mixture thereof. For example, the film-forming components may be one or more materials selected from the group consisting of the resins, polyols, reactive diluents, stabilizing resins, dispersing resins, functionally reactive surfactants, and mixtures thereof typically used in the coatings art.

Preferred film-forming components (b) are those polymers and oligomers known to participate in useful film-forming reactions in the coatings art. In a most preferred embodiment, at least one of the one or more film-forming components (b) will be the dispersing or stabilizing resin used in dispersing reactive component (a) in the preparation of aqueous dispersion (A).

Illustrative examples of suitable one or more film-forming components (b) include polyester resins, polyacrylate resins, polyurethane resins, alkyd resins, cellulose resins, polyethers resins, and mixtures thereof. Preferred examples of such resins will contain a plurality of functional groups imparting water dispersibility such as hydroxyl groups, acid groups, beta hydroxy carbamate groups, acrylonitrile, and mixtures thereof, with hydroxyl groups being most preferred.

For example the one or more film-forming component (b) may generally be those polymer resins having active hydrogen-containing functional groups. Such polymer resins include, for example, acrylic polymers, modified acrylic polymers, polyesters, polyepoxides, polycarbonates, polyurethanes, polyamides, polyimides, and polysiloxanes, all of which are well known in the art. Preferably, the polymer is an acrylic, modified acrylic or polyester. More preferably, the polymer is an acrylic polymer. Active hydrogen-containing functional groups on polymer resins are well known in the art. Such groups include, for example, hydroxyl groups, amino groups, thiol groups, hydrazide groups, carbamate groups, especially primary carbamate groups, and activated methylene groups.

In one preferred embodiment of the invention, the coating composition will comprise a film-forming component (b) which is an acrylic polymer or oligomer. The acrylic polymer preferably has a molecular weight of 500 to 1,000,000 Daltons and more preferably of 1500 to 50,000. As used herein, "molecular weight" refers to number average molecular weight, which may be determined by the GPC method using a polystyrene standard. Such polymers are well-known in the art, and can be prepared from monomers such as methyl acrylate, acrylic acid, methacrylic acid, methyl methacrylate, butyl methacrylate, cyclohexyl methacrylate, and the like. The active hydrogen functional group, e.g., hydroxyl, can be incorporated into the ester portion of the acrylic monomer. For example, hydroxy-functional acrylic monomers that can be used to form such polymers include hydroxyethyl acrylate, hydroxybutyl acrylate, hydroxybutyl methacrylate, hydroxypropyl acrylate, and the like. Amino-functional acrylic monomers would include t-butylaminoethyl methacrylate and t-butylamino-ethylacrylate. Other acrylic monomers having active hydrogen functional groups in the ester portion of the monomer are also within the skill of the art.

Modified acrylics can also be used as a film-forming component (b). Such acrylics may be polyester-modified acrylics or polyurethane-modified acrylics, as is well-known in the art. Polyester-modified acrylics modified with ε-caprolactone are described in U.S. Pat. No. 4,546,046 of Etzell et al, the disclosure of which is incorporated herein by reference. Polyurethane-modified acrylics are also well known in the art. They are described, for example, in U.S. Pat. No. 4,584,354, the disclosure of which is incorporated herein by reference.

Polyesters having active hydrogen groups such as hydroxyl groups can also be used as film-forming component (b). Such polyesters are well known in the art, and may be prepared by the polyesterification of organic polycarboxylic acids (e.g., phthalic acid, hexahydrophthalic acid, adipic acid, maleic acid) or their anhydrides with organic polyols containing primary or secondary hydroxyl groups (e.g., ethylene glycol, butylene glycol, neopentyl glycol).

Polyurethanes having active hydrogen functional groups are also well known in the art. They are prepared by a chain extension reaction of a polyisocyanate (e.g., hexamethylene diisocyanate, isophorone diisocyanate, MDI, etc.) and a polyol (e.g., 1,6-hexanediol, 1,4-butanediol, neopentyl glycol, trimethylol propane). They can be provided with active hydrogen functional groups by capping the polyurethane chain with an excess of diol, polyamine, amino alcohol, or the like.

As discussed above, these examples of suitable film-forming components (b) may and most preferably will possess functional groups capable of reacting with one or both of reactive component (a) and crosslinking component (B) to produce thermally reversible or irreversible bonds. In the latter case, the respective functional groups must be selected from the above-identified pairs that produce thermally irreversible bonds. Thus, in a most preferred embodiment, the most preferred film-forming components (b) will have one or more functional groups selected from the above-identified pairs that produce thermally irreversible bonds.

The concentration of organic binder component (A1) in aqueous dispersion (A) will generally be from 5 to 95% by weight of the total weight of aqueous dispersion (A), more preferably from 25 to 95% by weight, and most preferably from 50 to 90% by weight of the total weight of aqueous dispersion (A).

Aqueous dispersion (A) will generally have a viscosity suitable for application in industrial and automotive manufacturing processes. Suitable viscosities are those in the range of from 50 to 400 mPas @ $375s^{-1}$ @ 25° C.

The aqueous dispersion of organic binder component (A1) comprising reactive component (a) and optionally one or more of film-forming components (b) and/or crosslinking component (B) into water may occur with chemical aids, i.e., ionic and/or nonionic surfactants, dispersing and/or stabilizing resins; mechanical means via the high stress and/or high shear equipment such as microfluidizers and combinations thereof.

Illustrative ionic surfactants include ionic or amphoteric surfactants such as sodium lauryl sulfate. An example of a suitable commercially available ionic surfactant is ABEX EP110 from Rhodia of Cranbury, N.J. Amino and alkali salts of dodecybenenesulfonic acid such as the dimethylethanolamine salt of dodecylbenzenesulfonic acid and sodium dodecylbenzenesulfonic acid and sodium dioctylsulfosuccinate may also be used.

Illustrative nonionic surfactants include nonionic surfactants based on polyethoxylated alcohols or polyethoxypolyalkoxy block copolymers, polyoxyethylenenonylphenyl ethers, polyoxyethylenealkylallyl ether sulfuric acid esters and the like.

Mechanical means such as high stress techniques can also be used to prepare the aqueous dispersion (A). Alternative modes of applying stress to a mixture of water and organic binder component (A1) can be utilized so long as sufficient stress is applied to achieve particle sizes in the range noted above. For example, one alternative manner of applying stress would be the use of ultrasonic energy.

A preferred high stress technique for preparing aqueous dispersion (A) uses a MICROFLUIDIZER® emulsifier, available from Microfluidics Corporation in Newton, Mass. The MICROFLUIDIZER® high-pressure impingement emulsifier is patented in U.S. Pat. No. 4,533,254. The device consists of a high-pressure (up to 25,000 psi) pump and an interaction chamber where the emulsification takes place. Generally, the mixture of organic binder component (A) and water is passed through the emulsifier once at a pressure between 5,000 and 15,000 psi. Multiple passes can result in smaller average particle size and a narrower range for the particle size distribution.

Mechanical means such as high stress techniques may also be combined with the chemical dispersion aids such the surfactants such as discussed above or the stabilizing and/or dispersing resins discussed below. Most preferably, the high stress techniques will be combined with suitable chemical aids, especially stabilizing resins and/or dispersing resins.

Illustrative examples of suitable dispersing and/or stabilizing resins or polymers are the hydroxyl-containing emulsifiers taught in U.S. Pat. No. 6,309,710 and various non-polyalkoxylated stabilizing resins.

Suitable hydroxyl-containing emulsifiers are preferably diols and/or polyols having emulsifying properties, with particular preference diols and/or polyols having a molecular weight of between 500 and 50,000 Daltons; with very particular preference, having a molecular weight of between 500 and 10,000 Daltons and, in particular, from 500 to 5000 Daltons. The emulsifying diols and/or polyols are preferably selected from the group of the polyacrylate-diols and/or -polyols, polyester-diols and/or -polyols and polyether-diols and/or -polyols, and, with very particular preference, from the group of the polyurethane-diols and/or -polyols, polycarbonate-diols and/or -polyols, and polyether-diols and/or -polyols.

The ratio of hydrophilic to hydrophobic moieties in the diols and/or polyols is preferably established either by way of the molecular weight of the diols and/or polyols and the fraction of hydrophilic groups already present in the diol and/or polyol, or by the introduction of additional hydrophilic groups, such as acid groups or salts thereof, examples being carboxyl or carboxylate groups, sulfonic acid or sulfonate groups, and phosphonic acid or phosphonate groups.

Particularly preferred polyether-diols and/or -polyols are block copolyethers consisting of ethylene oxide and propylene oxide units, the proportion of ethylene oxide units being from 30 to 50% and the proportion of propylene oxide units being from 50 to 70% by weight. The molecular weight is preferably around 9000 daltons. Emulsifiers of this kind are sold, for example, by BASF AG under the trade name Pluronic.RTM. PE 9400.

A particularly preferred stabilizing resin is an acrylic copolymer having a plurality of functional groups that impart water dispersibility. Such stabilizing resins are the free radical polymerization product of one or more hydrophobic ethylenically unsaturated monomers and one or more hydrophilic ethylenically unsaturated monomers, such monomers being used in an appropriate ratio so as to achieve the desired degree of stabilization. It will be appreciated that the plurality of stabilizing or water dispersible functional groups will typically be incorporated into the copolymer via the polymerization of the hydrophilic monomers.

Most preferred stabilizing resins will normally have a number average molecular weight of from 5000 to 50,000 Daltons, preferably from 10,000 to 25,000 Daltons, with molecular weights of from 15,000 to 20,000 Daltons being most preferred. Most preferred stabilizing resins will further have an acid number of from 40 to 60, preferably 42 to 52, and most preferably 44 to 48.

The functional groups that impart water dispersibility or stability to the stabilizing resin can be anionic, cationic, or nonionic. Anionic and nonionic groups are most preferred because of the tendency of the cationic groups, (i.e., amine) groups to cause yellowing in any final cured coating.

Suitable hydrophobic ethylenically unsaturated monomers are vinyl esters, vinyl ethers, vinyl ketones, aromatic or heterocyclic aliphatic vinyl compounds, and alkyl esters having more than 4 carbon atoms of alpha, beta-ethylenically unsaturated mono- or dicarboxylic acids containing 3 to 5 carbons. Preferred are the aromatic or heterocyclic aliphatic vinyl compounds and the C4 or greater alkyl esters of alpha, beta-unsaturated monocarboxylic acids such as acrylic or methacrylic acid.

Representative examples of suitable esters of acrylic, methacrylic, and crotonic acids include, without limitation, those esters from reaction with saturated aliphatic and cycloaliphatic alcohols containing from 4 to 20 carbon atoms, such as n-butyl, isobutyl, tert-butyl, 2-ethylhexyl, lauryl, stearyl, cyclohexyl, trimethylcyclohexyl, tetrahydrofurfuryl, stearyl, and sulfoethyl. Preferred are alkyl esters of from 4 to 12 carbon atoms, with alkyl esters of from 4 to 10 carbon atoms being most preferred. 2-ethylhexyl acrylate is especially preferred.

Representative examples of aromatic or heterocyclic aliphatic vinyl compounds include, without limitation, such compounds as styrene, alpha-methyl styrene, vinyl toluene, tert-butyl styrene, and 2-vinyl pyrrolidone. Styrene is a most preferred example.

Most preferred hydrophobic monomers for use in making stabilizing resins suitable in the instant invention are styrene, ethylhexyl acrylate, and butyl methacrylate.

Suitable hydrophilic ethylenically unsaturated monomers are those that act to stabilize both the stabilizing resin and organic binder component (A1) in the aqueous dispersion (A). Illustrative examples are low molecular weight alkyl acrylate esters that allow hydrogen bonding, weak hydrogen bond donors, strong hydrogen bond donors, and hydrogen bond acceptors based on polyethers.

For example, low molecular weight alkyl esters of alpha, beta-ethylenically unsaturated monocarboxylic acids having alkyl groups of less than three carbons may be used as the hydrophilic monomers. Representative examples include the esters of acrylic and methacrylic acid with saturated aliphatic alcohols of three or less carbons atoms, i.e., methyl, ethyl, and propyl.

Suitable weak hydrogen bond donors are those ethylenically unsaturated monomers having functional groups such as hydroxyl, carbamate, and amide. Carbamate functional ethylenically unsaturated monomers such as described below may be used. Hydroxyl functional ethylenically unsaturated monomers such as hydroxyalkyl acrylates and methacrylates are also suitable. Representative examples include, without limitation, hydroxy ethyl acrylate, hydroxyethyl methacrylate, and the like. Also suitable are acrylic and methacrylic acid amides and aminoalkyl amides, acrylonitrile and methacrylonitrile.

Strong hydrogen bond donors such as strong acids are also suitable for use as the hydrophilic monomers. Useful ethylenically unsaturated acids include alpha,beta-olefinically unsaturated monocarboxylic acids containing 3 to 5 carbon atoms, alpha,beta-olefinically unsaturated dicarboxylic acids containing 4 to 6 carbon atoms and their anhydrides, unsaturated sulfonic acids, and unsaturated phosphonic acids. Representative examples include, without limitation, acrylic acid, methacrylic acid, crotonic acid, fumaric acid, maleic acid, itaconic acid and their respective anhydrides. Acrylic and methacrylic acid are most preferred.

Polyether based hydrogen bond acceptors may also be used in the most preferred stabilizing resin. Useful ethylenically unsaturated polyethers include ethylene oxide and the alkoxy poly(oxyalkylene) alcohol esters or amides of alpha,beta-olefinically unsaturated monocarboxylic acids containing 3 to 5 carbon atoms. The alkoxy poly(oxyalkylene) alcohol or alkoxy poly(oxyalkylene) amine employed in forming the monomer can be obtained by the alkoxylation of monohydric alcohols with ethylene oxide or mixtures of ethylene oxide with other epoxides of up to ten carbon atoms, such as propylene oxide or butylene oxide.

The residue of the alkoxy poly(oxyalkylene) alcohol or amine contained in an acrylic polymer suitable as the most preferred stabilizing resin can be represented by $D(CH(R_1)CH_2O—)_nR_2$, and is either alkoxy polyoxyethylene or an alkoxy polyoxyethylene/polyoxyalkylene copolymer, having a degree of polymerization of n, n being an integer from one to one thousand. D is O in the case of the alkoxy poly(oxyalkylene) alcohol and NH in the case of the amine. Preferably, n is an integer from 20 to 200; more preferably, from 40 to 70. $R_1$ is thus either hydrogen or a mixture of hydrogen and alkyls of one to eight carbon atoms. It is particularly advantageous for $R_1$ to be either hydrogen or a mixture of hydrogen and alkyls of one to three carbon atoms. $R_2$ is an alkyl of one to thirty carbon atoms. $R_2$ is preferably an alkyl of one to ten carbon atoms. In one embodiment, $R_1$ can be hydrogen and $R_2$ can be methyl.

Preferably, the hydrophilic monomers used to make suitable stabilizing resins will have functional groups selected from the group consisting of carboxylic acid groups, hydroxyl groups, oxirane groups, amide groups, and mixtures thereof. Most preferably, hydrophilic monomers having a mixture of acid groups, hydroxyl groups, and carbamate groups will be used. However, hydrophilic monomers having carboxylic acid groups will preferably be minimized as much as possible to avoid negative effects in finished film properties. Most preferred hydrophilic monomers are acrylic acid, hydroxy ethyl acrylate and hydroxy ethyl methacrylate.

In one embodiment of the invention, suitable stabilizing resins may include carbamate functional groups or functional groups convertible to carbamate groups such as hydroxyl or isocyanate. Such functional groups can be incorporated into the stabilizing resin via the polymerization of ethylenically unsaturated monomers containing the desired functionality such as described herein. Alternatively, a 'pre-stabilizing' copolymer could be reacted with a second compound having the desired functional group. The carbamate functionality can be introduced into the stabilizing resin in a variety of ways.

One way is to use in the polymerization reaction an acrylic monomer having carbamate functionality in the ester portion of the monomer. Such monomers are well known in the art and are described, for example in U.S. Pat. Nos. 3,479,328, 3,674,838, 4,126,747, 4,279,833, and 4,340,497. For example, one method of synthesis involves reaction of a hydroxy ester with urea to form the carbamyloxy carboxylate (i.e., carbamate-modified (meth)acrylate). Another method of synthesis reacts an alpha,beta-unsaturated acid ester with a hydroxy carbamate ester to form the carbamyloxy carboxylate. Yet another technique involves formation of a hydroxyalkyl carbamate by reacting a primary or secondary amine or diamine with a cyclic carbonate such as ethylene carbonate. The hydroxyl group on the hydroxyalkyl carbamate is then esterified by reaction with acrylic or methacrylic acid to form the carbamate-functional monomer. Other methods of preparing carbamate-modified acrylic monomers are described in the art and can be utilized as well. The carbamate functional acrylic monomer can then be polymerized along with the other suitable ethylenically unsaturated monomers described herein.

An alternative route for introducing the carbamate functionality onto a suitable stabilizing resin is to react a suitable already-formed or pre-stabilizing polymer with another component to adduct a carbamate-functional group to the acrylic polymer backbone, as described in U.S. Pat. No. 4,758,632, the disclosure of which is incorporated herein by reference. One technique for preparing carbamate-functional polymers involves thermally decomposing urea to ammonia and HNCO in the presence of a hydroxy-functional acrylic polymer to form as the reaction product a carbamate-functional acrylic polymer.

Another technique involves reacting the hydroxyl group of a hydroxyalkyl carbamate with the isocyanate group of an isocyanate-functional acrylic polymer to form the carbamate-functional acrylic polymer. Isocyanate-functional acrylics are known in the art and are described, for example in U.S. Pat. No. 4,301,257, the disclosure of which is incorporated herein by reference. Ethylenically unsaturated isocyanate monomers are well known in the art and include meta-isopropenyl-alpha,alpha-dimethylbenzyl isocyanate (sold by American Cyanamid as TMI®) and isocyanatoethyl methacrylate.

Yet another technique is to react cyclic carbonate groups on an acrylic with ammonia to form the carbamate-functional acrylic polymer. Cyclic carbonate-functional acrylic polymers are known in the art and are described, for example, in U.S. Pat. No. 2,979,514, the disclosure of which is incorporated herein by reference. Another approach is a transcarbamylation reaction of a hydroxy-functional polymer with an alkyl carbamate. Finally, a more difficult, but feasible, way of preparing a carbamate functional stabilizing resin would be to trans-esterify an acrylate polymer with a hydroxyalkyl carbamate.

The hydrophilic monomers used to prepare the most preferred stabilizing resin should be used in an amount of from 4 to 80% by weight, preferably from 10 to 40%, most preferably from 20 to 30% by weight, all based on the total amount of monomers used to prepare the stabilizing resin. The hydrophobic monomers should be used in an amount of from 20 to 96% by weight, preferably from 60 to 90% by weight, most preferably from 65 to 85% by weight, all based on the total amount of monomers used to prepare the stabilizing resin.

The stabilizing resins most preferred for use in preparing the aqueous dispersion (A) of the invention may be prepared by using conventional techniques, such as free radical polymerization, cationic polymerization, or anionic polymerization, in, for example, a batch or semi-batch process, with free radical polymerization being most preferred. For instance, the polymerization may be carried out by heating the ethylenically unsaturated monomers in bulk or in organic solution or aqueous dispersion in the presence of a free radical source, such as an organic peroxide or azo compound and, optionally, a chain transfer agent for a batch process; or, alternatively, the monomers and initiator(s) may be fed into the heated reactor at a controlled rate in a semi-batch process.

Typical free radical sources are organic peroxides such as dialkyl peroxides, peroxyesters, peroxydicarbonates, diacyl peroxides, hydroperoxides, and peroxyketals; and azo compounds such as 2,2'-azobis(2-methylbutanenitrile) and 1,1'-azobis(cycohexanecarbonitrile). Typical chain transfer agents are mercaptans such as octyl mercaptan, n- or tert-dodecyl mercaptan, thiosalicyclic acid, mercaptoacetic acid, and mercaptoethanol; halogenated compounds, and dimeric alpha-methyl styrene.

The free radical polymerization used to prepare suitable stabilizing resins is usually carried out at temperatures from about 20° C. to about 200° C., preferably from 90° C. to 170° C. The reaction may conveniently be done at the temperature at which the solvent or solvent mixture refluxes, although reflux is not necessary to the reaction. The initiator should be chosen to match the temperature at which the reaction is carried out, so that the half-life of the initiator at the reaction temperature should preferably be no more than thirty minutes.

If solvents are used in the polymerization reaction used to make the stabilizing resin, the solvents used are preferably water or water-soluble or -miscible organic solvents that can function as cosolvents. A cosolvent is useful to aid in dispersion of the components and in flow during cure of the composition. Examples of useful solvents include methyl ethyl ketone, methyl isobutyl ketone, xylene, n-amyl acetate; and cosolvents such as N-methylpyrrolidone and glycol ethers like ethylene glycol butyl ether, ethylene glycol butyl ether acetate, diethylene glycol butyl ether, ethylene glycol 2-ethylhexyl ether, propylene glycol methyl ether, propylene glycol methyl ether acetate, propylene glycol butyl ether, and dipropylene glycol butyl ether.

The solvent or solvent mixture is generally heated to the reaction temperature and the monomers and initiator(s) used to make the stabilizing resin are added at a controlled rate over a period of time, usually between 2 and 6 hours. A chain transfer agent or additional solvent may be added concurrently with the monomers and initiator(s). The mixture is usually held at the reaction temperature after the additions for a period of time to complete the reaction. Optionally, additional initiator may be added during the latter stages of the addition or after the addition is completed, usually over a period of one to sixty minutes, to ensure complete conversion.

It is preferred that the aqueous dispersions (A) of the invention be prepared using chemical aids with or without the assistance of high stress or high shear techniques. More preferably the aqueous dispersions (A) will not require the use of high stress techniques or will require only minimal application of high stress techniques. Preferred chemical aids for use in preparing the aqueous dispersions (A) are dispersing and/or stabilizing resins, with acrylic copolymer stabilizing resins that do not contain polyalkoxylated groups such as are described above being most preferred for use in preparing the aqueous dispersions (A) of the invention.

Coating compositions of the invention will further comprise a crosslinking component (B). Crosslinking component (B) may be present either as part of organic binder component (A1) in aqueous dispersion (A) or as part of a separate aqueous dispersion. Crosslinking component (B) may also be a water-soluble or water dispersible material present in the coating composition of the invention and need not be part of an aqueous dispersion. Most preferably, crosslinking component (B) will be present in the coating compositions of the invention as part of the aqueous dispersion (A).

Crosslinking component (B) will be used in amounts of from 1 to 90%, preferably from 3 to 75%, and more preferably from 25 to 50%, all based on the total fixed vehicle of the coating composition, i.e., the % NV of aqueous dispersion (A) and crosslinking component (B).

If crosslinking component (B) is present in aqueous dispersion (A), it may or may not be part of organic binder component (A1). In either case, crosslinking component (B) may be incorporated into aqueous dispersion (A) as per the preceding discussion.

As discussed above, crosslinking component (B) will comprise functional groups (iiii) that are reactive with one or both of reactive component (a) and one or more film-forming components (b), and preferably with both components (a) and (b). Crosslinking component (B) may a single polymer or resin or may be a mixture of two or more crosslinking components. Thus, crosslinking component may have one or more types of functional groups (iii).

In a preferred embodiment, the reaction between crosslinking component (B) and reactive component (a) will produce a thermally irreversible bond as discussed above. It will be appreciated that in this case, the selection of functional groups (iii) will be dependent upon the selection of the functional groups of either reactive component (a) or one or more film-forming components (b). That is, the functional groups of crosslinking component (B) and the component reacting therewith must form one of the functional group "pairs" discussed above which result in thermally irreversible linkages.

For example, when the functional groups of either component (a) or (b) are hydroxyl, functional groups (iii) of crosslinking component (B) may be selected from the group consisting of isocyanate (blocked or unblocked), epoxy, and mixtures thereof, and most preferably will be isocyanate groups, whether blocked or unblocked.

Illustrative examples of epoxy functional crosslinking components (B) are all known epoxy functional polymers and oligomers. Preferred epoxy functional crosslinking agents are glycidyl methacrylate polymers and isocyanurate containing epoxy functional polymers such as trisglycidyl isocyanurate and the reaction product of glycidol with an isocyanate functional isocyanurate such as the trimer of isophorone diisocyanate (IPDI).

Illustrative examples of isocyanate functional crosslinking agents (B) are all known isocyanate functional polymers and oligomers. Preferred isocyanate functional crosslinking agents are isocyanato ethylacrylate polymers and the trimers of diisocyanates such as IPDI and hexamethylene diisocyanate (HDI), which may be blocked or unblocked.

When the functional groups of either reactive component (a) or a film-forming component (b) are carboxyl, functional groups (iii) will most preferably be epoxy as described above.

When the functional groups of either reactive component (a) or a film-forming component (b) are carbamate, the functional groups (iii) of crosslinking component (B) may be selected from the group consisting of aminoplast resins, aldehydes, and mixtures thereof. Most preferably, when the functional groups of reactive component (a) and/or a film-forming component (b) are carbamate, functional groups (iii) of crosslinking component (B) will be aminoplast functional groups if a thermally irreversible linkage is desired. Alternatively, if thermally reversible linkages are sufficient, the functional groups (iii) of crosslinking component (B) may be isocyanate when the functional groups of components (a) and/or (b) are carbamate. In this case, the resulting link is an allophanate which can be made to be reversible during the curing process when Lewis acid catalysts such as dibutyl tin diacetate are used.

Illustrative examples of suitable aminoplast resins are melamine formaldehyde resins (including monomeric or polymeric melamine resin and partially or fully alkylated melamine resin), urea resins (e.g., methylol ureas such as urea formaldehyde resin, alkoxy ureas such as butylated urea formaldehyde resin), and carbamate formaldehyde resins.

When the functional groups of reactive component (a) and/or a film-forming component (b) are epoxy, functional groups (iii) may be carboxyl or hydroxyl, or mixtures thereof, carboxyl being most preferred.

Illustrative examples of carboxyl functional crosslinking components (B) are acid functional acrylics, acid functional polyesters, acid functional polyurethanes, and the reaction products of polyols such as trimethylol propane with cyclic anhydrides such as hexahydrophthalic anhydride. Such materials are known in the art.

When the functional groups of reactive component (a) and/or a film-forming component (b) are cyclic carbonate, functional groups (iii) should be amine if a thermally irreversible linkage is desired. An illustrative example of an amine functional crosslinking component (B) is triaminononane.

Similarly, when the functional groups of reactive component (a) and/or a film-forming component (b) are amine, functional groups (iii) should be cyclic carbonate, isocyanate functional as described above, or mixtures thereof in order to obtain thermally irreversible linkages.

Cyclic carbonate functional crosslinking components (B) may be obtained by the reaction product of carbon dioxide with any of the above described epoxy functional crosslinking components (B). Alternatively, a cyclic carbonate functional monomer may be obtained by the reaction of carbon dioxide with an epoxy functional monomer such as glycidyl methacrylate or glycidol, followed by polymerization/oligomerization of the cyclic carbonate functional monomer. Additional methods of obtaining cyclic carbonate functional crosslinking agents are known in the art and may be used.

When the functional groups of reactive component (a) and/or a film-forming component (b) are isocyanate, functional groups (iii) may be hydroxy, amine or mixtures thereof in order to obtain thermally irreversible linkages, hydroxy being most preferred.

Hydroxy functional crosslinking components (B) are polyols, hydroxy functional acrylics, hydroxy functional polyesters, hydroxy functional polyurethanes, hydroxy functional isocyanurates and mixtures thereof as are known in the art.

The above noted crosslinking components (B) are also suitable for use in those embodiments where crosslinking component (B) is used to provide a thermally reversible bond. It will be appreciated that in this case, the respective functional groups will be selected so as not to form any of the above noted "pairs" which produce thermally irreversible groups.

Examples of functional groups that are reactive with each other and result in thermally reversible bonds are well known in the art. Illustrative examples are the reaction of aminoplasts with polyols, the reaction of cyclic anhydrides with polyols, and the reaction of activated secondary carbamates such as TACT with hydroxy groups. Suitable examples of the individual components are discussed above and may be selected accordingly.

Additional water and or cosolvent may be added during preparation of the coating compositions of the invention. In a preferred embodiment of the invention, the water and organic solvent, including any cosolvent, is present in the coating composition in an amount of from about 0.01 weight percent to about 99 weight percent, preferably from about 40 weight percent to about 90 weight percent, and more preferably from about 50 weight percent to about 70 weight percent, based on the total weigh of all organic components.

The coating composition used in the practice of the invention may include a catalyst to enhance the cure reactions between reactive component (a), crosslinking agent (B), and any film-forming components (b). For example, when aminoplast compounds, especially monomeric melamines, are used as crosslinking agents (B), a strong acid catalyst may be utilized to enhance the cure reaction. Such catalysts are well known in the art and include, without limitation, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Strong acid catalysts are often blocked, e.g. with an amine. Other catalysts that may be useful in the composition of the invention include Lewis acids, zinc salts, and tin salts.

Additional agents, for example surfactants, fillers, stabilizers, wetting agents, dispersing agents, adhesion promoters, UV absorbers, hindered amine light stabilizers, etc. may be incorporated into the coating compositions of the invention. While such additives are well known in the prior art, the amount used must be controlled to avoid adversely affecting the coating characteristics.

Coating compositions according to the invention may be used as primers, especially weatherable primers, basecoats, topcoats, and/or clearcoats. They are particularly suitable for use in coating compositions used in composite color-plus-clear coating systems and the like, and may be one component or two component. In a particularly preferred embodiment, coating compositions according to the invention are preferably utilized in high-gloss coatings and/or as clearcoats of composite color-plus-clear coatings. High-gloss coatings may be described as coatings having a 20° gloss or more (ASTM D523-89) or a DOI (ASTM E430-91) of at least 80.

When the coating composition of the invention is used as a high-gloss pigmented paint coating, the pigment may be any organic or inorganic compounds or colored materials, fillers, metallic or other inorganic flake materials such as mica or aluminum flake, and other materials of kind that the art normally includes in such coatings. Pigments and other insoluble particulate compounds such as fillers are usually used in the composition in an amount of 1% to 100%, based on the total solid weight of organic binder component (A1) and crosslinking component (B) and any other film-forming components. (i.e., a pigment-to-binder ratio of 0.1 to 1).

When the coating composition according to the invention is used as the clearcoat of a composite color-plus-clear coating, the pigmented basecoat composition may any of a number of types well known in the art, and does not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. In one preferred embodiment of the invention, the basecoat composition also utilizes a carbamate-functional acrylic polymer. Basecoat polymers may be thermoplastic, but are preferably crosslinkable and comprise one or more type of crosslinkable functional groups. Such groups include, for example, hydroxy, isocyanate, amine, epoxy, acrylate, vinyl, silane, and acetoacetate groups. These groups may be masked or blocked in such a way so that they are unblocked and available for the crosslinking reaction under the desired curing conditions, generally elevated temperatures. Useful crosslinkable functional groups include hydroxy, epoxy, acid, anhydride, silane, and acetoacetate groups. Preferred crosslinkable functional groups include hydroxy functional groups and amino functional groups.

Basecoat polymers may be self-crosslinkable, or may require a separate crosslinking agent that is reactive with the functional groups of the polymer. When the polymer comprises hydroxy functional groups, for example, the crosslinking agent may be an aminoplast resin, isocyanate and blocked isocyanates (including isocyanurates), and acid or anhydride functional crosslinking agents.

Coating compositions can be coated on desired articles by any of a number of techniques well known in the art. These include, for example, spray coating, dip coating, roll coating, curtain coating, and the like. For automotive body panels, spray coating is preferred.

The coating compositions of the invention may be applied may be applied to a wide variety of substrates; especially those typically encountered in the transportation/automotive industries. Illustrative examples include metal substrates such as steel, aluminum, and various alloys, flexible plastics, rigid plastics and plastic composites.

The coating compositions described herein are preferably subjected to conditions so as to cure the coating layers. Although various methods of curing may be used, heat curing is preferred. Generally, heat curing is effected by exposing the coated article to elevated temperatures provided primarily by radiative heat sources. Curing temperatures will vary depending on the particular blocking groups used in the cross-linking agents, however they generally range between 90° C. and 180° C. The first compounds according to the present invention are preferably reactive even at relatively low cure temperatures. Thus, in a preferred embodiment, the cure temperature is preferably between 115° C. and 150° C., and more preferably at temperatures between 115° C. and 140° C. for a blocked acid catalyzed system. For an unblocked acid catalyzed system, the cure temperature is preferably between 80° C. and 100° C. The curing time will vary depending on the particular components used, and physical parameters such as the thickness of the layers, however, typical curing times range from 15 to 60 minutes, and preferably 15–25 minutes for blocked acid catalyzed systems and 10–20 minutes for unblocked acid catalyzed systems.

EXAMPLES

Example 1

Part a

Preparation of a Reactive Component (a)

A mixture of 59.4 parts of Pripol™ saturated fatty acid dimer diol, (commercially available from Uniqena), 20.1 parts methyl carbamate, 20.4 parts toluene and 0.09 parts of dibutyl tin oxide are heated to reflux. Once at reflux, the methanol is removed from the reaction mixture and the toluene is allowed to return to the reaction mixture. After 96% of the hydroxy groups are converted to primary carbamate groups, the excess methyl carbamate and toluene are removed by vacuum distillation. A dicarbamate functional reactive component (a) was obtained.

Part b

Preparation of Organic Binder Component (A1)

| Material | Amount |
| --- | --- |
| Reactive component (a) from part (a) | 92.2 |
| Acrylic dispersing resin[1] | 68.8 |
| AMP solution[2] | 1.7 |
| Deionized water | 144.6 |

[1]The acrylic dispersing resin is a 67% NV resin in propylene glycol propyl ether, and has a acid number of 48 and a hydroxy number of 64.
[2]AMP solution is a 20% solution in deionized water of 2-amino-2-methyl-1-propanol.

Reactive component (a) was heated in a water bath to its melting point. The molten reactive component (a) was then mixed with the acrylic dispersing resin. A solution of 20% 2-amino-2methyl-1-propanol in deionized water was then added under agitation to the mixture. Deionized water was added to achieve a theoretical non-volatile content of 45%.

Part c

Preparation of Waterborne Clearcoat According to the Invention

To 155.5 parts of the organic binder component (A1) from part b, the following ingredients were added:

| Material | Amount (on paint NV) |
| --- | --- |
| Hexamethoxymethyl melamine | 30.0 |
| DDBSA[3] | 4.0 |

[3]Diisopropanolamine salt of dodecylbenzene sulfonic acid, 25% active in methanol Deionized water was then added to the resulting paint mixture to reduce viscosity to 180 mPas at a shear rate of 375/sec.

Part d

Evaluation of the Waterborne Clearcoat According to the Invention

An acrylic/melamine red metallic waterborne basecoat was spray applied to a 4 inch/10.16 cm by 18 inch/45.72 cm electrocoated steel panel with a hand spray siphon gun to achieve 0.9 mils/22.86 microns of dry film. The panel was then flashed for 5 minutes at 140° F./60° C. After allowing the panel to cool to room temperature, the clearcoat of part c was applied with a hand spray siphon gun to achieve a gradient of film thickness down the panel. The panel was flashed for 10 minutes at room temperature, and 10 minutes at 140° F./60° C. It was then transferred to a 270° F./132° C. oven and baked for 25 minutes. Clearcoat film thickness was measured along the length of the panel, and the point at which clearcoat popping occurred was noted. Pop tolerance was measured to be greater than 2.7 mils/68.58 microns of clearcoat.

Example 2

Part a

Preparation of a Mixture Containing a Reactive Component (a) and a Film-forming Component (b)

A mixture of 30 parts of a tri-carbamate functional material as described in Example 1 of U.S. Pat. No. 5,336,566 but with all of the solvent removed and 70 parts of the reactive component (a) from Example 1, part a was mixed together. The mixture was stirred on a hot plate until a homogenous mixture was obtained.

Part b

Preparation of Organic Binder Component (A1)

Using the technique of Example 1, part b, an organic binder component was prepared using the following materials.

| Material | Amount |
| --- | --- |
| Mixture from Ex. 2, part b | 268.0 |
| Acrylic Dispersing resin[4] | 197.2 |
| AMP solution[5] | 6.8 |
| Deionized water | 480.4 |

[4]Same acrylic dispersing resin as used in Example 1.
[5]Same AMP solution as used in Example 1.

Part c

Preparation of Waterborne Clearcoat According to the Invention

Using the technique of example 1, part c, a waterborne clearcoat was produced using the following materials.

| Material | Amount (on paint NV) |
| --- | --- |
| Organic binder component from Example 2, part b | 534.1 |
| Hexamethoxymethyl melamine | 125.7 |
| Acrysol RM8W | 10.2 |
| BYK345 | 7.7 |
| DDBSA[6] | 14.0 |

[6]Same as DDBSA used in Example 1.

The invention claimed is:
1. A curable waterborne coating composition consisting essentially of
(A) an aqueous dispersion comprising an organic binder component (A1) comprising at least 5% by weight of
(a) a reactive component which is substantially free of any heteroatoms and is not a crystalline solid at room temperature comprising

(i) from 12 to 72 carbon atoms, and
(ii) two or three functional groups, based on the total weight of organic binder component (A1), and
(b) one or more film-forming components including at least one of polymers, oligomers, monomers, or mixtures thereof having at least one functional group and
(B) at least one crosslinking component comprising a plurality of functional groups (iii) reactive with the functional groups of compound (b), wherein said functional groups react with functional groups on at least one of (a)(ii) or (b) and are selected such that reaction there between produces a thermally irreversible chemical linkage that is a urethane or ester linkage.

2. The curable waterborne coating composition of claim 1 wherein crosslinking agent (B) comprises a plurality of functional groups (iii) reactive with the functional groups (ii) of compound (a).

3. The curable waterborne coating composition of claim 1 wherein aqueous dispersion (A) comprises crosslinking agent (B).

4. The curable waterborne coating composition of claim 1 wherein crosslinking agent (B) is comprised in a second aqueous dispersion (A').

5. The curable waterborne coating composition of claim 1 wherein the organic binder component (A1) comprises from 5 to 100% by weight of reactive component (a), based on the total weight of organic binder component (A1).

6. The curable waterborne coating composition of claim 1 wherein film-forming component (b) comprises at least one of the group consisting of dispersing resins, stabilizing resins, surfactants having at least one functional group reactive with crosslinking agent (B), and mixtures thereof.

7. The curable waterborne coating composition of claim 6 wherein organic binder component (A1) comprises from 5 to 80% by weight of reactive component (a) and from 20 to 95% by weight of one or more film-forming components (b), all based on the total weight of organic binder component (A1).

8. The curable waterborne coating composition of claim 7 wherein organic binder component (A1) comprises from 5 to 75% by weight of reactive component (a) and from 75 to 95% by weight of one or more film-forming components (b), all based on the total weight of organic binder component (A1).

9. The curable waterborne coating composition of claim 7 wherein one or more film-forming components (b) comprise a stabilizing resin.

10. The curable waterborne coating composition of claim 9 wherein the stabilizing resin is a hydroxyl-containing emulsifier.

11. A curable waterborne coating composition comprising
(A) an aqueous dispersion comprising an organic binder component (A1) comprising at least 5% by weight of
(a) a reactive component which is substantially free of any heteroatoms and is not a crystalline solid at room temperature comprising
(i) from 12 to 72 carbon atoms, and
(ii) two or three functional groups, based on the total weight of organic binder component (A1), and
(b) one or more film-forming components including at least one of polymers, oligomers, monomers, or mixtures thereof and further including at least one of dispersing resins, stabilizing resins, surfactants having at least one functional group reactive with crosslinking agent (B), or mixtures thereof and
(B) at least one crosslinking component comprising a plurality of functional groups reactive with functional groups on at least one of components (a) or (b).

12. The curable waterborne coating composition of claim 11 wherein organic binder component (A1) comprises from 5 to 80% by weight of reactive component (a) and from 20 to 95% by weight of one or more film-forming components (b), all based on the total weight of organic binder component (A1).

13. The curable waterborne coating composition of claim 12 wherein organic binder component (A1) comprises from 5 to 75% by weight of reactive component (a) and from 75 to 95% by weight of one or more film-forming components (b), all based on the total weight of organic binder component (A1).

14. The curable waterborne coating composition of claim 12 wherein one or more film-forming components (b) comprise a stabilizing resin.

15. The curable waterborne coating composition of claim 14 wherein the stabilizing resin is a hydroxyl-containing emulsifier.

* * * * *